United States Patent [19]

Staron et al.

[11] 4,396,317
[45] Aug. 2, 1983

[54] TOOL HOLDER HAVING COOLANT FLUID DELIVERY SYSTEM

[75] Inventors: John C. Staron, Wisconsin Dells, Wis.; John W. Lehde, Jr., Chicago, Ill.

[73] Assignee: The Bendix Corporation, Southfield, Mich.

[21] Appl. No.: 272,589

[22] Filed: Jun. 11, 1981

[51] Int. Cl.³ .............................................. B23G 1/46
[52] U.S. Cl. .................................... 408/59; 10/89 F; 10/141 H; 10/20; 10/141
[58] Field of Search ......................... 408/59, 141, 142; 279/20; 409/136; 10/89 F, 141 H

[56] References Cited
U.S. PATENT DOCUMENTS 3,487,748  1/1970  Grage .................................. 409/136
4,080,090  3/1978  Kern .................................... 408/59

FOREIGN PATENT DOCUMENTS 2435188  5/1976  Fed. Rep. of Germany ........ 279/20

Primary Examiner—Z. R. Bilinsky
Attorney, Agent, or Firm—Kenneth A. Seaman

[57] ABSTRACT

A tool holder (10) in which coolant fluid is delivered to a driven tool (115) through a piston (220) which extends through an axial passage in the tool holder (10) and its collet or chuck (170) and is held in contact with the tool (115) by pressure of the coolant fluid. The tool holder advantageously provides an axial float in which springs mount the tool (115) to the tool holder (10) and allow the collet to follow the lead of the tool. The coolant delivery system (200), although acting in an axial direction, does not interfere with the axial "float" of the tool and collet, as the fluid pressure is chosen to be great enough to provide a face seal and small enough not to destroy the float of the tool.

1 Claim, 5 Drawing Figures

TOOL HOLDER HAVING COOLANT FLUID DELIVERY SYSTEM

BACKGROUND OF THE INVENTION

The present invention relates to tool holders in which coolant fluid is transmitted through the holder to a tool. Such tool holders provide a transmission of driving force (rotation) from a machine tool spindle as well as holding on retention of the tool. The present invention is more particularly related to a tap driving apparatus having a coolant fluid delivery system to a tap (or tapping tool) which is used to cut threads in holes in a work piece.

In such systems, a tap driving apparatus typically includes a floating mounting or holder in which springs mount the tap to the apparatus to allow the tap to follow the tap lead into the workpiece. A light spring provides a mounting in a tension direction on the tap, and a spindle is fed (advanced) at a rate of approximately 90 percent of the tap lead, so that the tap can pull ahead of the spindle feed and follow its lead, independent of the spindle feed. In such cases, it is not desirable to put a high axial force or a thrust on the tool (as could be applied by pressurized coolant), because such an axial force would defeat the floating mounting concept by forcing the tool into its forward stop where there is no float.

Examples of tool holders including a floating mounting are shown in U.S. Pat. Nos. 2,981,544 and 2,533,758, but these tool holders lack a through coolant fluid delivery system, and there has been no simple but effective way to add such a system to tap driving tool holders without destroying the floating feature.

Coolant fluid, supplied to the cutting tool through an internal passage in the cutting tool from a rear shank to a forward cutting portion, allows cooling of the cutting edges and a flushing out of chips created during cutting. Cooling and cleaning accomplished by the coolant fluid extends the life of the tool and allows driving the tool at a higher rotational speed.

In some tool holders, coolant fluid is "side-fed" into a reservoir extending around the tool shank at its rear end. This type of tool cooling system is shown generally in U.S. Pat. Nos. 3,024,030 and 3,791,660. In many applications such a delivery system is acceptable and presents few problems. It does require seals to isolate the fluid. However, in a tap driving apparatus, the tension part of the tension-and-compression "float" arrangement may be defeated by the pressurized coolant, which typically is delivered in the 500 to 1,000 psi range. Pressure, which is necessary to move the coolant forward to the cutting tip, tends to move the tool to its forward limit also, defeating the float. Such operation of pressurized coolant delivery system is undesirable in such applications.

Some prior art systems couple the coolant fluid to the tool through "O" rings (or other sealing type components) located at the tool/tool holder interface. These "O" rings engaging the tool are undesirable in some applications as they create parts to fail and wear out, requiring periodic replacement. Failure of the "O" rings can lead to tool holder failure through coolant leakage. It is important that coolant fluid be isolated from the tap drive mechanism, particularly the tension-and-compression float.

Some of the prior art systems additionally do not have an effective method for compensating for wear of the components and thus require a periodic adjustment and/or reconstruction to avoid fluid leakage and other undesirable effects.

In some other instances of coolant tools, it is necessary to use a collet to hold a tool within the tool holder and to fill collet slots with a rubber or other sealing compound to seal coolant fluid reservoir within the collet from leaking. This filling of collet slots is time consuming, adds expense, and is undesirable in that it restricts the ability to freely change tools and requires frequent resealing.

Other limitations and disadvantages of the prior art tool holders and coolant fluid delivery systems will be apparant to one skilled in the art in view of the following detailed description of the present invention and the accompanying drawings.

SUMMARY OF THE INVENTION

The present invention overcomes the limitations and disadvantages of the prior art coolant fluid tool holders by providing a tool holder driving apparatus which has an axial coolant fluid delivery system via a movable piston held against the tap by a force of pressurized fluid acting against a piston head.

In such a system, a relatively small piston head transmits a minimum force on the tool and allows the tool to be freely positioned with respect to the tool holder, to allow a tension-and-compression axial "float" of the tool with respect to the tool holder.

The present invention has an advantageous effect that the high pressure of the coolant fluid is generally balanced and exerts a minimum thrust or resistance to axial movement while allowing high pressure propulsion of the fluid. The tool (e.g., a tap) is thus free to follow its lead, and advance axially in response thereto as contrasted with being dependent on the spindle drive for axial advancement. The high coolant pressure insures that the fluid will be transmitted through the tool and tool holder.

An additional advantageous effect of the present invention is a use of fluid pressure to provide a sealed or enclosed fluid delivery system into the tool (tap.) Such a system compensates for wear and eliminates the need for "O" rings or other sealing components located at the tool/tool holder interface.

A further advantage of the present invention is that it does not require a rubber or other sealing compound between collet slots to create a confined fluid reservoir within the collet.

Other objects and advantages will be apparent to those skilled in the art in view of the following detailed description of the present invention and the accompany drawings.

DETAILED DESCRIPTION OF THE DRAWINGS

Figure 1:
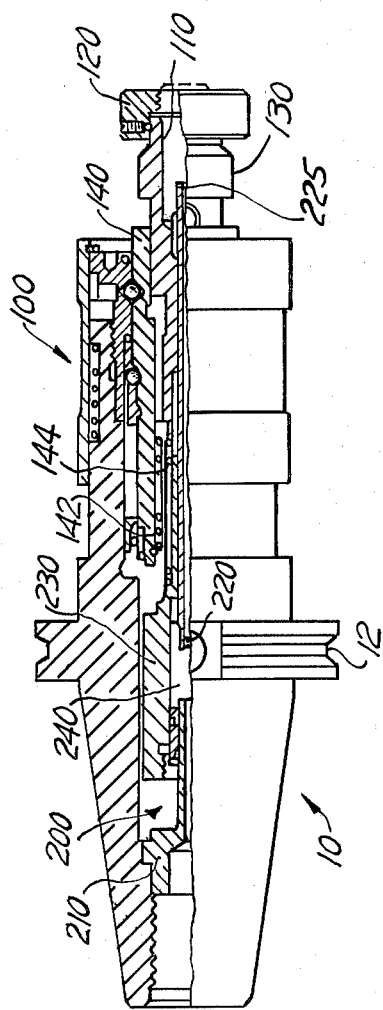
FIG. 1 is a side view of a tool holder apparatus of the present invention, partially cut away to show internal structure of the tool holder.

FIG. 1 shows a tool holder 10 of the present invention, in a partial cross sectional view. As shown in this figure, the tool holder 10 includes a mounting flange 12 for coupling to a conventional machine tool driving apparatus (a machine tool spindle). The mounting flanges may be configured in any of many styles different according to the type of machine on which the tool holder 10 is to be used.

Within the tool holder 10 there are a tool (tap) driving assembly 100 and a coolant delivery system 200. The tool holder 10 is generally cylindrical about its longitudinal axis and the coolant delivery system 200 extends rearwardly from the tool driving assembly 100 along the axis of the tool holder 10.

The tap driving assembly 100 is generally conventional as is associated with tension-and-compression type floating tool holders. A tool receiving aperture 110 extends rearwardly from a forward surface, and is surrounded by a locking nut 120. A collet drive 130 and a cam drive 140 are provided, with the collet drive 130 being mounted to the housing by two springs 142, 144 which provide a tension-and-compression float of the collet drive 130.

The coolant delivery system 200 includes a fluid coupling 210 and a fluid delivery piston 220 mounted within a body 230 defining a fluid chamber 240. The fluid delivery piston 220 has a forward tubular end 225 which extends into the tap receiving aperture 110, through a rear aperture in a tap collet (not shown).

Figure 2:
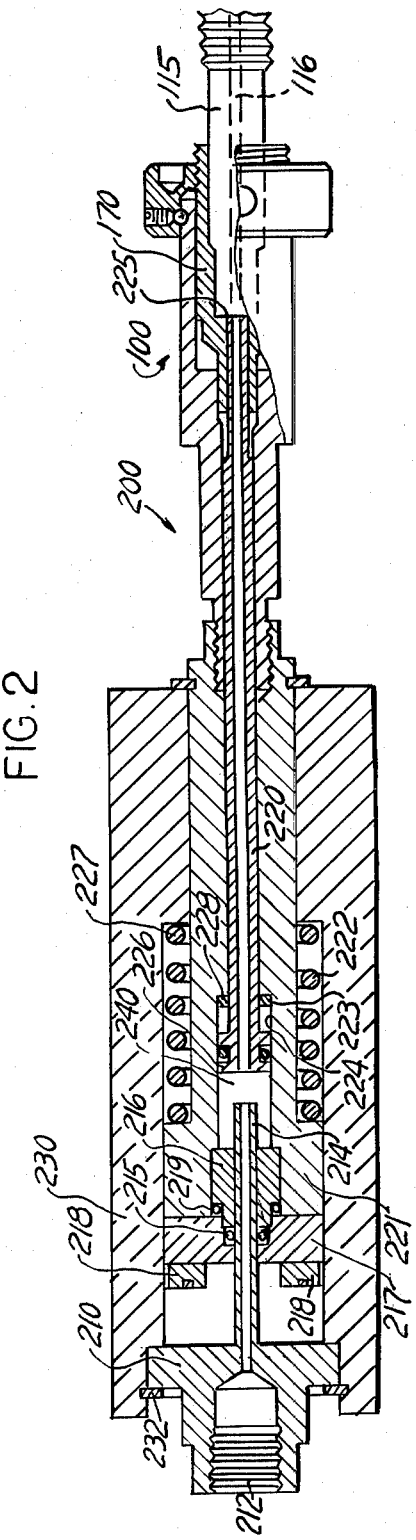
FIG. 2 is an enlarged view of the rear portion of the assembly of FIG. 1.

FIG. 2 is an enlarged partially cross-sectional view, primarily of the fluid delivery system 200, but showing also the tap driving assembly 100 and a portion of a tap 115. The tap 115 has an internal axial fluid passage 116 which extends from a rear end of the tap forwardly to terminate adjacent cutting edges of the tap. The tap 115 is mounted within a tap collet or chuck 170.

The fluid delivery system 200 includes the fluid coupling 210, the fluid delivery piston 220, the body 230 and the fluid chamber 240. As shown in FIG. 2, one embodiment of the fluid coupling 210 is mounted to the body 230 by a snap ring 232 received in an undercut on the rear end of the body. The fluid coupling 210 has a threaded entry passage 212 to which a source of coolant fluid from an external source is coupled. The coolant fluid is typically supplied at 500-1000 psi (350-700 grams/mm$^2$) in conventional machine tool applications. A tubular forward end 214 extends into the fluid chamber 240. A second, or alternate embodiment of a fluid coupling 210', is shown enlarged in FIG. 3 and discussed in greater detail in connection with that figure.

The fluid piston 220 of FIG. 2 is mounted within a piston body 221 which is movably mounted within the body 230 by a spring 222. A stop washer 223 is mounted within a passage 224 of the piston body 221 to limit the forward movement of the fluid piston 220. The fluid piston includes an enlarged head 226 having a sealing "O" ring 227 mounted to an undercut 228.

A bushing 216 is mounted within the rear end of the passage 224 of the piston body 221 and receives the tubular forward end of the fluid coupling 210 therethrough while allowing the piston body 221 to move with respect to the fluid coupling 210.

An end cap 217 is held to the piston body 221 by two cap screws 218, while "O" rings 215, 219 prevent fluid from the fluid chamber 240 from leaking out past the bushing 216 and the fluid coupling tube end 214.

The forward tubular end 225 of the piston 220 is urged by fluid pressure against the rear end of the tap 115 so that a face seal is created between the piston 220 and the tap 115. The fluid pressure (applied to the head 226) maintains the piston 220 with its forward end 225 in contact with the tap regardless of the position of the tool.

The piston body 221 is coupled to the tap driving apparatus 100 to move with it approximately 5/32 inches (approximately 4 mm) with a central passage of approximately 1/16 inch (approximately 1.5 mm). The surface area of the head 226 exceeds the surface area of the bushing 216 by approximately 0.016 square inches (13.7 square mm). This different in area results in a force on the head 226 of the piston and 220 which is strong enough to urge the piston rod 220 into a face seal but not strong enough to override (and thus defeat) the tension-and-compression "float" mounting in the tap driver.

Figure 3:
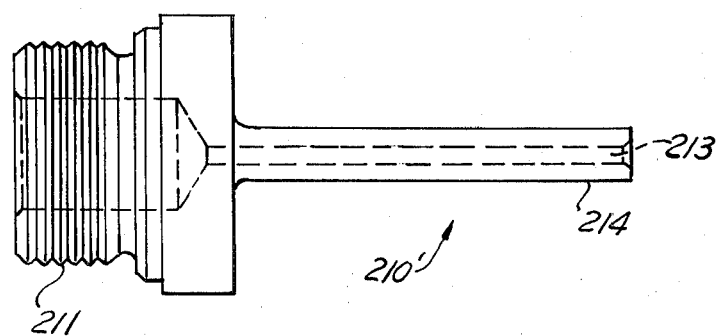
FIG. 3 is an enlarged view of an fluid delivery apparatus shown in FIGS. 1 and 2.

FIG. 3 is an enlarged external view of the second, or alternate embodiment of the fluid coupling 210' of the present invention. In this view, external threads 211 are provided for receiving a connection to fluid under pressure. The elongated forward end 214' is provided for extending into the fluid chamber (240 in FIG. 2), through the end cap (217) and the bushing (216) and for receiving sealing "O" rings. A fluid passage 213 is provided extending through the fluid coupling 210'.

Figure 4:
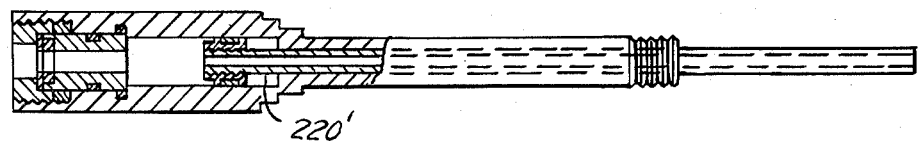
FIG. 4 is an enlarged view of an example of a slightly modified coolant delivery piston useful in the present invention.

FIG. 4 shows a slightly modified piston 220' and piston rod 221' assembly in a partial cross sectional view. Although the piston 220' and the piston rod 221' differ slightly in structure in this view, they are functionally equivalent. A slightly compressible nylon or soft steel rod could be used to compensate for an out-of-square face condition on the tap rear end or the forward end of the rod.

Figure 5:
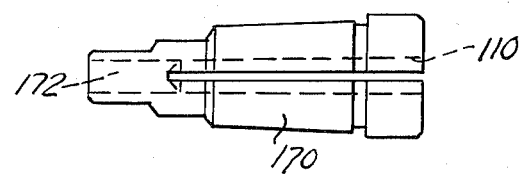
FIG. 5 is an enlarged view of a tap collet or chuck as modified for use in the present invention.

FIG. 5 shows a side view of the tap collet or chuck 170 used to retain the tap. The tap collet 170 is a conventional, preferably of the type sold as a JT-1 type available from the Industrial Tools Division of The Bendix Corporation in which a hole 172 has been drilled through the tang end, to communicate with the tap receiving aperture 110. In use, the fluid piston 220 extends through the hole 172 in the tang end to reach the tap 115.

The foregoing description of the preferred embodiment is merely exemplary of the present invention. The structure shown and described may be modified in one or more of several ways which are known to those skilled in the tool holder making art. Further, some of the features of the present invention may be used without the corresponding use of other features. For example, while the present preferred embodiment is disclosed as having fluid pressure for maintaining the piston rod in contact with the tap, in a hydraulic force arrangement, it may be feasible to use a mechanical force from a spring or even possibly a pneumatic or a magnetic force to maintain the two members in contact. It is also feasible that the coolant feed in some devices may be from the side, rather than the rear as disclosed in the preferred embodiment. While the invention may have particular use in tap drivers, it is also suitable for drilling, milling and other tool holders in which fluid must be delivered through the holder body. Accordingly, the present description of the preferred embodiment should be considered as merely illustrative of the present invention and should not be considered as limiting the scope of the present invention which is defined solely by the following claims.

Having thus described the invention, what is claimed is:

1. An apparatus for receiving and retaining a tap in a rotatable-driving relationship when said apparatus is coupled to a machine tool spindle and for transmitting pressurized coolant fluid from said spindle to an aperture in said tap, said apparatus comprising:
   an elongated body having a central axis;
   a tap-receiving member mounted within said elongated body by resilient means to allow a retained tap to be rotatably driven and follow its lead axially without corresponding axial movement of the body while allowing limited movement of the tap with respect to the body in either direction along the central axis of the body;
   means for transmitting coolant fluid to the retained tap without eliminating the resilient mounting between the tap and the body, said transmitting means including:
   means defining a fluid chamber within said body for receiving pressurized coolant fluid from said spindle;
   a fluid transmitting tube extending between the fluid chamber and a coolant receiving aperture in said retained tap, said tube passing through the tap retaining member; and
   an enlarged head coupled to said fluid transmitting tube within said chamber, said head receiving a force from the pressurized fluid in said chamber and urging said tube into the coolant receiving aperture in said retained tap to retard coolant leakage therebetween.

* * * * *